United States Patent
Lee

(10) Patent No.: US 9,342,163 B2
(45) Date of Patent: May 17, 2016

(54) POSITION MEASURING DEVICE AND POSITION INFORMATION INPUT SYSTEM USING SAME

(71) Applicant: PNF Co., Ltd., Seongnam-si, Gyeonggi-do (KR)

(72) Inventor: Jae Jun Lee, Seoul (KR)

(73) Assignee: PNF CO., LTD., Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 14/378,872

(22) PCT Filed: Feb. 13, 2013

(86) PCT No.: PCT/KR2013/001097
§ 371 (c)(1),
(2) Date: Aug. 14, 2014

(87) PCT Pub. No.: WO2013/122370
PCT Pub. Date: Aug. 22, 2013

(65) Prior Publication Data
US 2015/0022505 A1    Jan. 22, 2015

(30) Foreign Application Priority Data
Feb. 17, 2012    (KR) ..................... 10-2012-0016437

(51) Int. Cl.
*G06F 3/0354*    (2013.01)
*G06F 1/16*    (2006.01)
*G06F 3/043*    (2006.01)

(52) U.S. Cl.
CPC .......... *G06F 3/03545* (2013.01); *G06F 1/1656* (2013.01); *G06F 3/043* (2013.01)

(58) Field of Classification Search
CPC .... G06F 1/1656; G06F 3/03545; G06F 3/043
See application file for complete search history.

(56) References Cited

U.S. PATENT DOCUMENTS

| 2004/0160429 | A1* | 8/2004 | Blake ..................... | G06F 3/043 345/179 |
| 2005/0219208 | A1* | 10/2005 | Eichenberger ...... | G06F 3/03543 345/157 |
| 2007/0234060 | A1* | 10/2007 | Tsubono ................ | G06F 21/31 713/176 |
| 2008/0133815 | A1* | 6/2008 | Mori ................... | G06F 13/4022 710/313 |
| 2010/0090910 | A1* | 4/2010 | Iizuka .................... | H01Q 1/084 343/702 |

FOREIGN PATENT DOCUMENTS

| JP | 3113161 | 7/2005 |
| KR | 10-2008-0076616 | 8/2008 |
| KR | 10-2009-0102579 | 9/2009 |

OTHER PUBLICATIONS

International Search Report for International Application No. PCT/KR2013/001097, dated Jun. 28, 2013.

* cited by examiner

*Primary Examiner* — Ariel Balaoing
(74) *Attorney, Agent, or Firm* — Kile Park Reed & Houtteman PLLC

(57) ABSTRACT

Disclosed are a position measuring device capable of precisely measuring a position of an electronic pen tip, and a position information inputting system using the same. The position measuring device includes: a position measuring unit configured to measure a position of a tip of an electronic pen using a reference signal and ultrasonic signals, and configured to input position information on the electronic pen tip to an electronic device; a housing where the position measuring unit is installed; and a coupling means having one end connected to the housing, and another end coupled to the electronic device, so as to couple the housing to one side of the electronic device. Under such configuration, the position measuring device can enhance reliability by precisely measuring positions of characters or symbols to be input to an electronic device having a screen, and can enhance a user's convenience by reducing time taken to input characters or symbols by preventing an erroneous operation.

9 Claims, 12 Drawing Sheets

POSITION MEASURING DEVICE AND POSITION INFORMATION INPUT SYSTEM USING SAME

TECHNICAL FIELD

The present invention relates to a position measuring device and a position information inputting system using the same, and more particularly, to a position measuring device capable of precisely measuring a position of an electronic pen tip, and a position information inputting system using the same.

BACKGROUND ART

Generally, a touch screen is implemented as a touch pad is attached to a display unit. Such touch screen is conventionally mounted to a Personal Digital Assistant (PDA). However, as various types of devices have a Graphical User Interface (GUI) therein, such touch screen is being widely applied to electronic devices such as a navigation system, a Point-Of-Sale (POS) device, an Automatic Teller Machine (ATM), a Portable Multimedia Player (PMP) and a mobile communication terminal.

Generally, a user inputs characters, symbols, or drawings using his or her finger using a touch screen. However, in some cases, an additional electronic pen may be used for precise input.

A method for inputting characters, symbols, etc. using an electronic pen will be explained as follows. Firstly, regions on the touch screen, where desired characters or symbols are positioned, are touched by an electronic pen. The desired characters or symbols are selected from characters or symbols arranged on a keyboard or a keypad displayed on the touch screen. Upon touch of the desired characters or symbols, a change of pressure or electrostatic capacity is sensed on the touch screen. As a result, the desired characters or symbols are displayed on the touch screen.

However, the conventional method for inputting characters or symbols may have the following problems.

Firstly, characters or symbols are densely arranged on the keyboard or the keypad due to a limited size of the touch screen. This may cause a change of pressure or electrostatic capacity not to be precisely sensed on a region on the touch screen, the region with which an electronic pen or a user's finger comes in contact.

As a result, a user's desired characters or symbols are not precisely input. This may lower reliability of the product. Further, it takes a long time to input characters or symbols due to an erroneous operation. This may cause user inconvenience.

DISCLOSURE OF THE INVENTION

Therefore, an object of the present invention is to provide a position measuring device capable of enhancing reliability by precisely measuring positions of characters or symbols to be input to an electronic device having a touch screen, and capable of enhancing a user's convenience by reducing time taken to input characters or symbols by preventing an erroneous operation, and a position information inputting system using the same.

To achieve these and other advantages and in accordance with the purpose of the present invention, as embodied and broadly described herein, there is provided a position measuring device, including: a position measuring unit configured to measure a position of a tip of an electronic pen using a reference signal and ultrasonic signals, and configured to input position information on the electronic pen tip to an electronic device; a housing where the position measuring unit is installed; and a coupling means having one end connected to the housing and another end coupled to the electronic device, and configured to couple the housing to one side of the electronic device.

The coupling means may include an insertion member inserted into one side of the electronic device; and a connection member positioned at one side of the insertion member, and connected to the housing.

The insertion member may be rotatably coupled to the connection member.

The connection member may be rotatably coupled to the housing.

A plurality of fixing recesses spaced from each other in a circumferential direction may be concaved from an outer surface of the connection member, such that a rotated state of the connection member by a predetermined angle with respect to the housing is maintained. A fixing protrusion, configured to be selectively inserted into the fixing recesses when the connection member is rotated, may protrude from one side of the housing.

The electronic pen may be provided with a reference signal generating unit configured to generate a reference signal, and an ultrasonic signal generating unit configured to generate ultrasonic signals. The position measuring unit may include a reference signal receiving unit provided on one side surface of the housing, and configured to receive a reference signal generated from the reference signal generating unit; and a plurality of ultrasonic signal receiving units configured to receive ultrasonic signals generated from the ultrasonic signal generating unit.

The plurality of ultrasonic signal receiving units may consist of a first ultrasonic signal receiving unit and a second ultrasonic signal receiving unit positioned at opposite sides based on the reference signal receiving unit.

The connection member and the housing may be coupled to each other by a joint unit configured to arrange the connection member and the housing on a straight line, or with a predetermined angle therebetween.

The joint unit may include a first inclination surface formed at one end of the connection member; a second inclination surface formed at one end of the housing; a protruding member protruding from a central part of one of the first inclination surface and the second inclination surface, such that the first inclination surface and the second inclination surface are rotatable in a contacted state thereto; and an insertion opening penetratingly-formed at a central part of another inclination surface, and configured to insert the protruding member thereinto.

A plurality of restriction protrusions each having a bent end portion may be formed at one of the first inclination surface and the second inclination surface contacting each other. A plurality of restriction recesses, configured to selectively insert and detach the restriction protrusions thereinto/therefrom, may be formed at another of the first inclination surface and the second inclination surface.

The housing may include a rear cover which forms an appearance of the housing; a circuit board accommodated in the rear cover, and electrically-connected to the insertion member when the connection member is fixedly-coupled to the circuit board; and a front cover coupled to a front side of the rear cover.

The insertion member may be provided with connection terminals on two surfaces thereof, so as not to have directivity when the position measuring device is connected to the electronic device.

A supporting member, having an exposure hole through which two surfaces of the insertion member are exposed to outside, may be provided at one side of the front cover. The supporting member may be configured to support a circumferential surface of the insertion member which forward protrudes from the front cover in a penetrating manner.

The supporting member may be provided with a non-conductive sheet which is inserted into one side surface of the supporting member, such that a non-used connection terminal provided on one surface of the insertion member is shielded from outside.

A switch, configured to disconnect an electrical-connection between the non-used connection terminal provided on one surface of the insertion member and the electronic device, may be provided at one side of the front cover.

A communication unit, configured to provide position information on a tip of the electronic pen to the electronic device, may be further installed at the housing.

The insertion member may be implemented as a universal serial bus (USB) terminal, and the communication unit may provide position information on a tip of the electronic pen measured by the position measuring unit, to the electronic device by a wired communication method.

The communication unit may provide position information on a tip of the electronic pen measured by the position measuring unit, to the electronic device by a wireless communication method.

To achieve these and other advantages and in accordance with the purpose of the present invention, as embodied and broadly described herein, there is provided a position information inputting system, including: an electronic pen configured to input content to be displayed on a screen of an electronic device; and the position measuring device configured to measure a position of a tip of the electronic pen.

The electronic pen may include a reference signal generating unit configured to generate a reference signal to be received by the reference signal receiving unit of the position measuring device; and an ultrasonic signal generating unit configured to generate ultrasonic signals to be received by the ultrasonic signal receiving units of the position measuring device.

Advantages

As aforementioned, in the present invention, reliability can be enhanced by precisely measuring positions of characters or symbols to be input to an electronic device having a touch screen, and a user's convenience can be enhanced by reducing time taken to input characters or symbols by preventing an erroneous operation.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a position measuring device according to an embodiment of the present invention, with reference to the accompanying drawings.

Figure 1:
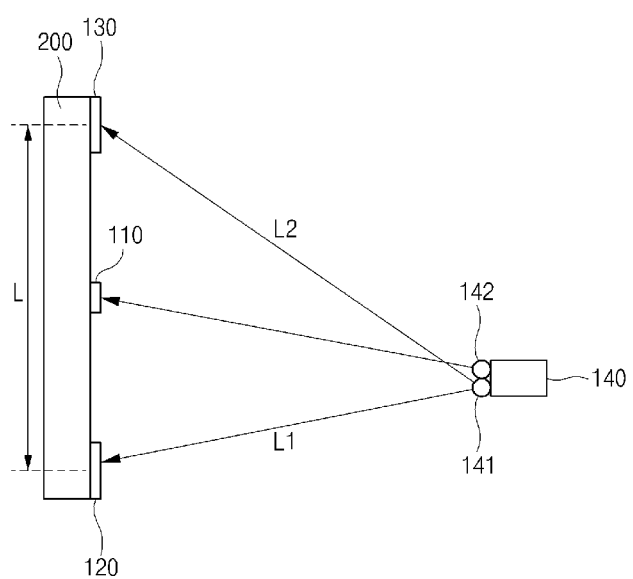
FIG. 1 is a view schematically illustrating a position measuring principle with respect to an electronic pen tip used in the present invention.
Figure 2:
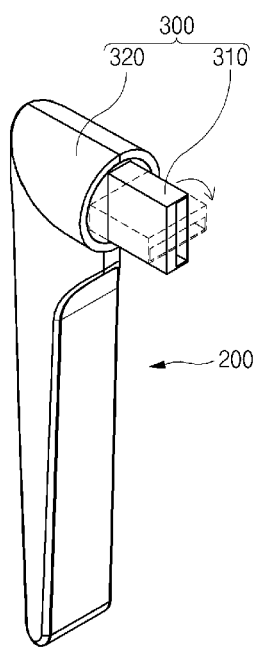
FIG. 2 is a perspective view illustrating a structure of a front surface of a position measuring device according to an embodiment of the present invention.
Figure 3:
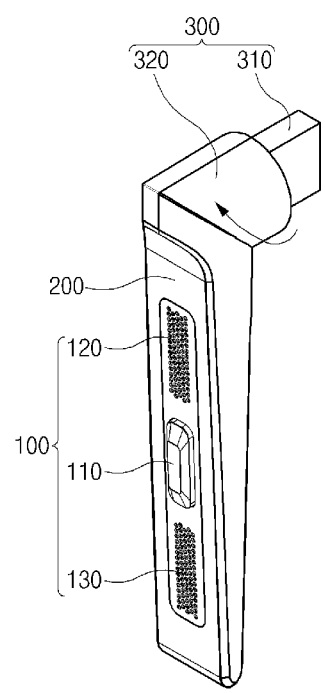
FIG. 3 is a perspective view illustrating a structure of a rear surface of a position measuring device according to an embodiment of the present invention.
Figure 4:
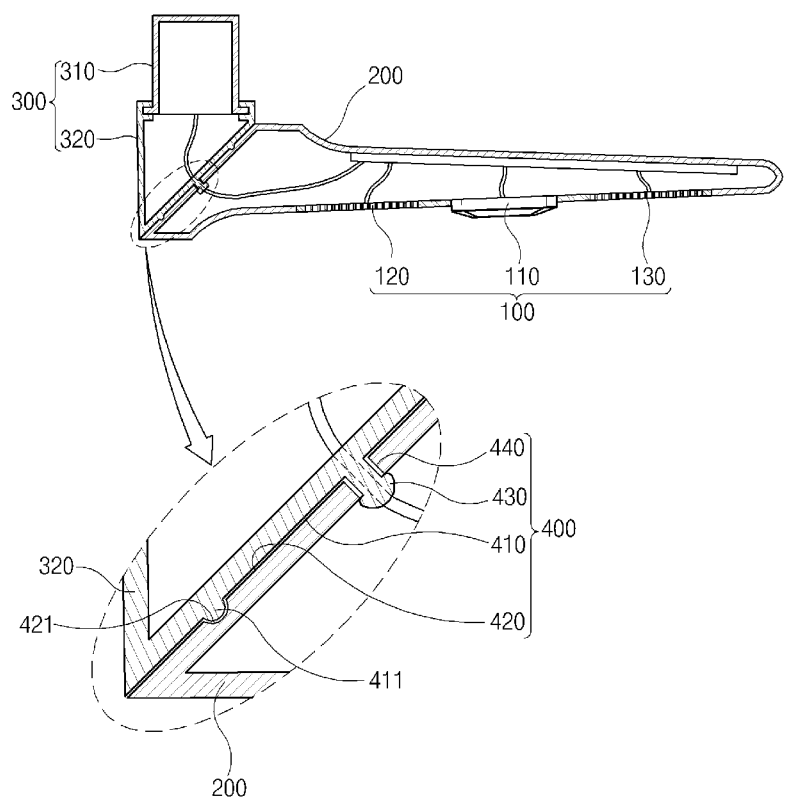
FIG. 4 is a side sectional view illustrating a structure of a position measuring device according to an embodiment of the present invention.
Figure 5:
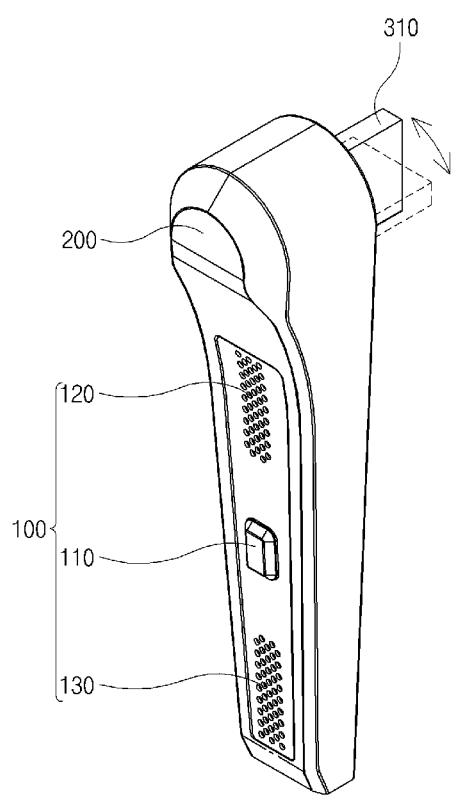
FIG. 5 is a perspective view illustrating a structure of a position measuring device according to another embodiment of the present invention.
Figure 6:
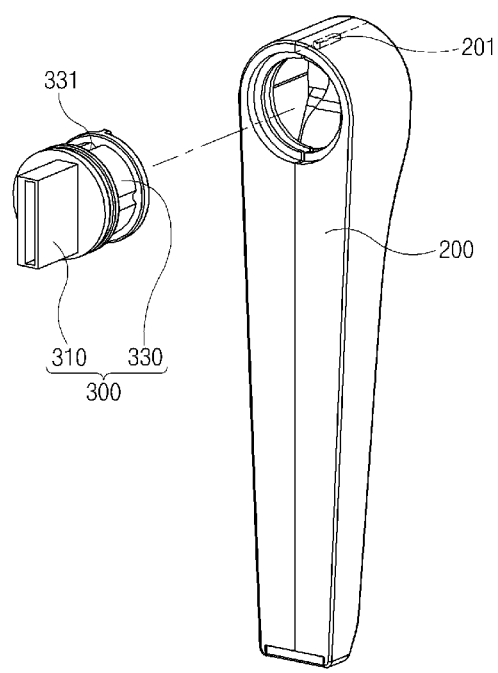
FIG. 6 is an exploded perspective view illustrating a structure of the position measuring device of FIG. 5.
Figure 7:
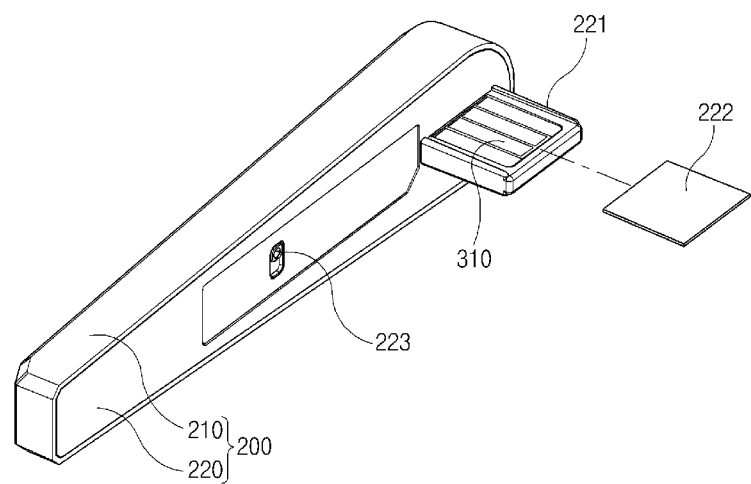
FIG. 7 is a perspective view illustrating a structure of a position measuring device according to still another embodiment of the present invention.
Figure 8:
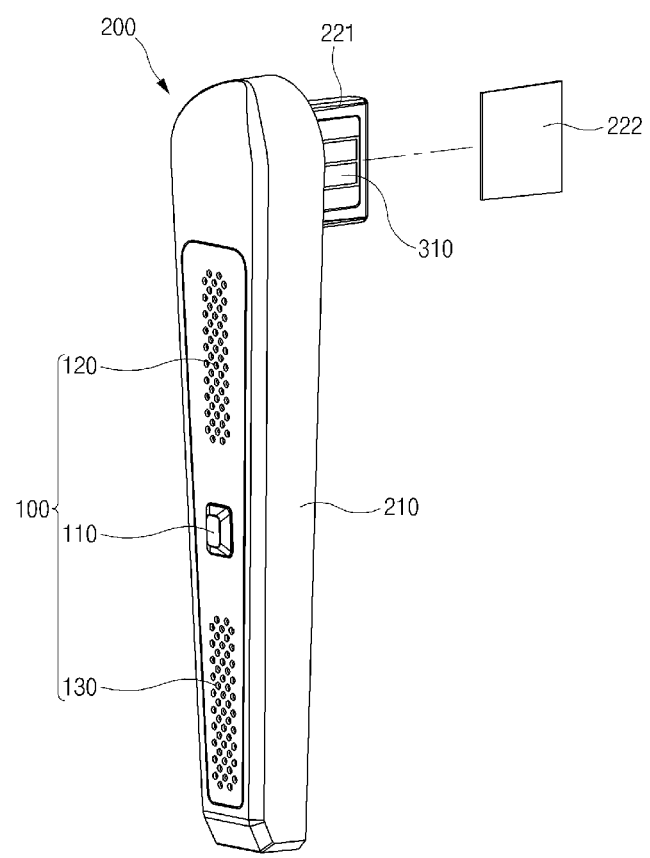
FIG. 8 is a perspective view of the position measuring device of FIG. 7, which has been seen from the left side.
Figure 9:
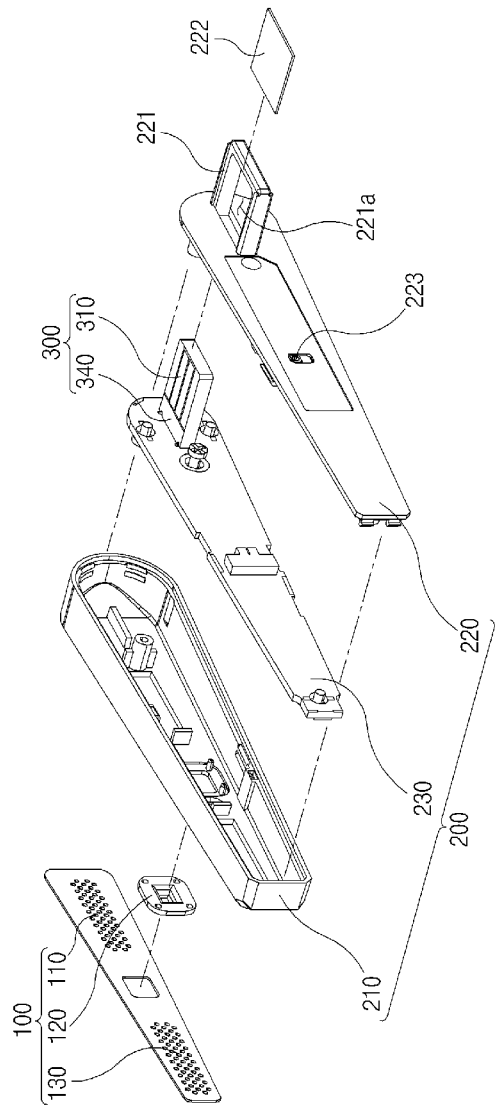
FIG. 9 is an exploded perspective view of a position measuring device according to still another embodiment of the present invention.
Figure 10:
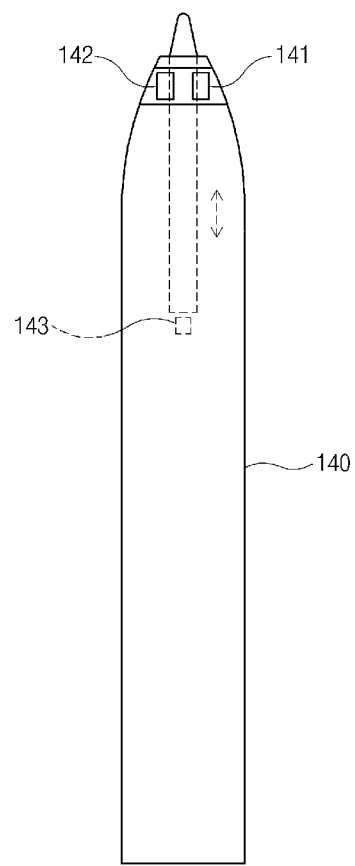
FIG. 10 is a planar view illustrating a structure of an electronic pen used in the present invention.
Figure 11:
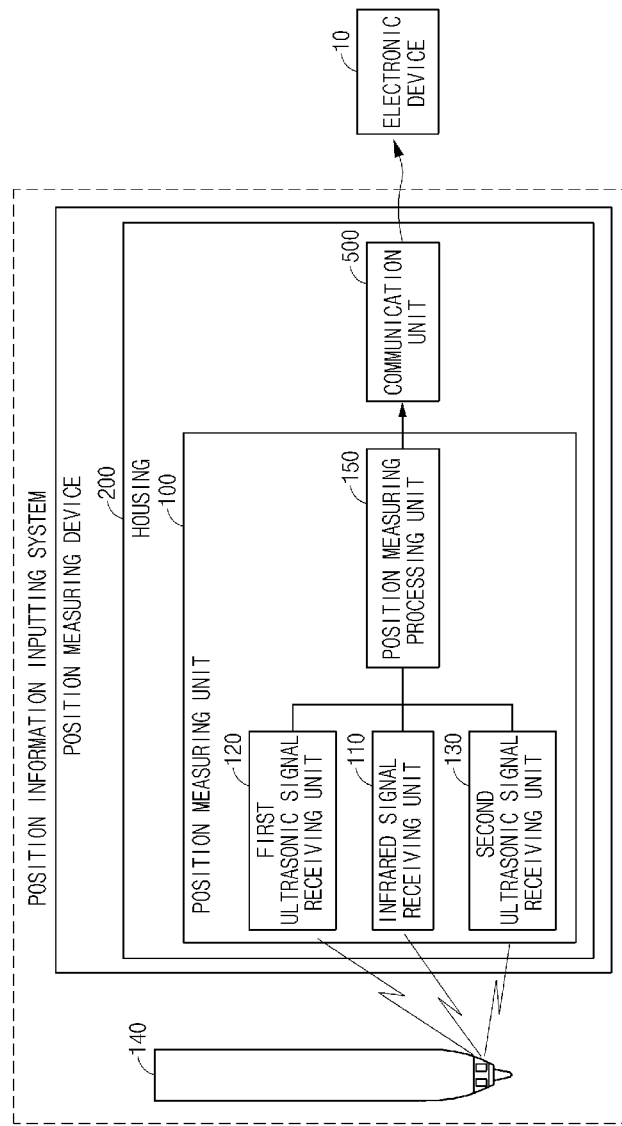
FIG. 11 is a block diagram illustrating an electrical connection structure of a position information inputting system according to the present invention.
Figure 12:
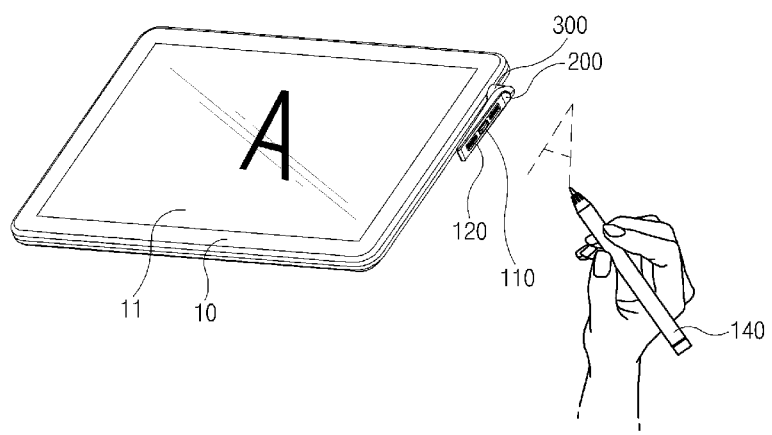
FIG. 12 is a view illustrating a state where a position measuring device according to an embodiment of the present invention is applied to a tablet PC.
Figure 13:
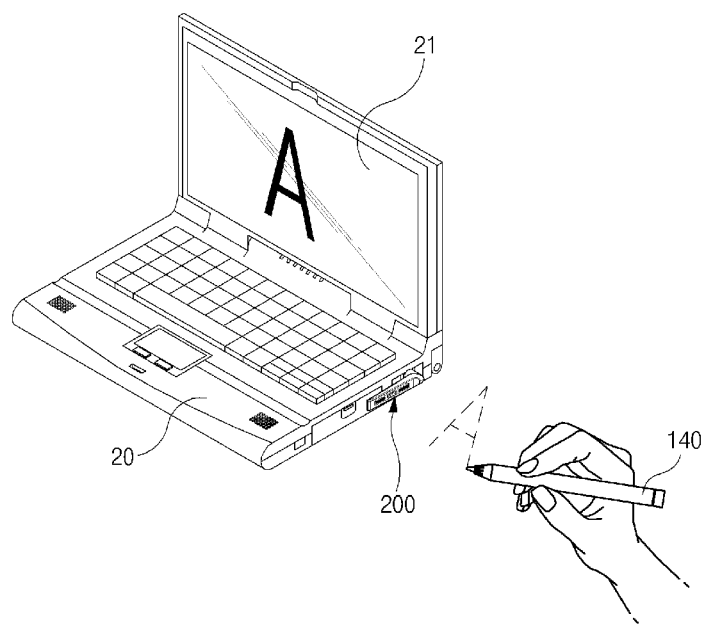
FIG. 13 is a view illustrating a state where a position measuring device according to an embodiment of the present invention is applied to a notebook.

FIG. 1 is a view schematically illustrating a position measuring principle with respect to an electronic pen tip used in the present invention. FIG. 2 is a perspective view illustrating a structure of a front surface of a position measuring device according to an embodiment of the present invention. FIG. 3 is a perspective view illustrating a structure of a rear surface of a position measuring device according to an embodiment of the present invention. FIG. 4 is a side sectional view illustrating a structure of a position measuring device according to an embodiment of the present invention. FIG. 5 is a perspective view illustrating a structure of a position measuring device according to another embodiment of the present invention. FIG. 6 is an exploded perspective view illustrating a structure of the position measuring device of FIG. 5. FIG. 7 is a perspective view illustrating a structure of a position measuring device according to still another embodiment of the present invention. FIG. 8 is a perspective view of the position measuring device of FIG. 7, which has been seen from the left side. FIG. 9 is an exploded perspective view of a position measuring device according to still another embodiment of the present invention. FIG. 10 is a planar view illustrating a structure of an electronic pen used in the present invention. FIG. 11 is a block diagram illustrating an electrical connection structure of a position information inputting system according to the present invention. FIG. 12 is a view illustrating a state where a position measuring device according to an embodiment of the present invention is applied to a tablet PC. FIG. 13 is a view illustrating a state where a position measuring device according to an embodiment of the present invention is applied to a notebook.

As shown, a position measuring device according to an embodiment of the present invention includes a position measuring unit 100 configured to measure a position of a tip of an electronic pen 140 using a reference signal and ultrasonic signals, and configured to input position information on the electronic pen tip to electronic device 10 or 20; a housing 200 where the position measuring unit 100 is installed; and a coupling means 300 having one end connected to the housing 200 and another end coupled to the electronic device 10 or 20, and configured to couple the housing 200 to one side of the electronic device 10 or 20.

Firstly, a position measuring principle with respect to a tip of the electronic pen applied to the present invention will be explained with reference to FIG. 1.

A first ultrasonic signal receiving unit 120 and a second ultrasonic signal receiving unit 130 are positioned at opposite sides based on an infrared signal receiving unit 110, with a distance of 'L/2', respectively. That is, a distance between the first ultrasonic signal receiving unit 120 and the second ultrasonic signal receiving unit 130 is 'L'.

It is assumed that a distance between the electronic pen 140 and the first ultrasonic signal receiving unit 120 is 'L1', and a distance between the electronic pen 140 and the second ultrasonic signal receiving unit 130 is 'L2'.

The position measuring principle of the present invention is as follows. First of all, first distance information on the 'L1' and second distance information on the 'L2' are calculated based on a difference of times when an infrared signal and ultrasonic signals generated from the electronic pen 140 are received by the position measuring device installed at the electronic device 10 or 20 having a screen 11 or 21, respectively. Then third distance information on the preset 'L' is obtained. The first distance information, the second distance information and the third distance information are applied to the Pythagorean Theorem, thereby accurately measuring a two-dimensional position of a tip of the electronic pen 140, on the screen 11 or 21 or a writing surface.

A reference signal, by which time differences (time delay) used to measure the 'L1' and the 'L2' can be calculated, may be any signal which is transmitted at a speed of light, e.g, an infrared signal or an RF signal. In the present invention, the reference signal is implemented as an infrared signal.

A product, to which the position measuring device of the present invention is applicable, may be any product having the screen 11 or 21, e.g., a personal digital assistant (PDA), a navigation, a portable multimedia player (PMP), a mobile communication terminal, a tablet PC, a notebook, etc.

FIGS. 2 to 4 illustrate a structure of a position measuring device according to an embodiment of the present invention.

As shown, the position measuring unit 100, a member for measuring a position of a tip of the electronic pen 140, may include a reference signal receiving unit 110 provided on one side surface of the housing 100, and configured to receive a reference signal generated from a reference signal generating unit 141 of the electronic pen 140; and a plurality of ultrasonic signal receiving units 120 and 130 provided on said one side surface of the housing 100, and configured to receive ultrasonic signals generated from an ultrasonic signal generating unit 142 of the electronic pen 140.

In the present invention, the reference signal is implemented as an infrared signal. Thus, the reference signal receiving unit 110 will be referred to as an 'infrared signal receiving unit 110'.

The infrared signal receiving unit 110 and the ultrasonic signal receiving units 120 and 130 are sequentially arranged on one side surface of the housing 100 in a lengthwise direction, with a predetermined interval therebetween.

The plurality of ultrasonic signal receiving units 120 and 130 include a first ultrasonic signal receiving unit 120 and a second ultrasonic signal receiving unit 130 disposed at two sides of the infrared signal receiving unit 110. A distance from the first ultrasonic signal receiving unit 120 to the infrared signal receiving unit 110 may be the same as a distance from the second ultrasonic signal receiving unit 130 to the infrared signal receiving unit 110.

That is, under an assumption that a distance between the first ultrasonic signal receiving unit 120 and the second ultrasonic signal receiving unit 130 is 'L', the infrared signal receiving unit 110 is arranged at a position 'L/2' where the distance between the first ultrasonic signal receiving unit 120 and the infrared signal receiving unit 110 is the same as the distance between the second ultrasonic signal receiving unit 130 and the infrared signal receiving unit 110.

The infrared signal receiving unit 110 is not necessarily arranged at the position 'L/2' which corresponds to the half of the distance between the first ultrasonic signal receiving unit 120 and the second ultrasonic signal receiving unit 130. That is, the infrared signal receiving unit 110 may be arranged at any position where signals can be received.

A position measuring processing unit 150 is additionally provided at the housing 100. The position measuring processing unit 150 is configured to calculate a position of a tip of the electronic pen 140, based on a time difference between a time when a reference signal (infrared signal) has been received by the infrared signal receiving unit 110, and times when ultrasonic signals have been received by the plurality of ultrasonic signal receiving units 120 and 130, respectively.

The coupling means 300 may include an insertion member 310 having one part inserted into one side of the electronic device 10 or 20; and a connection member 320 provided to enclose another part of the insertion member 310, and configured to connect the electronic device 10 or 20 to the housing 200.

The insertion member 310 is inserted into a communication port additionally disposed at one side of the electronic device 10 or 20, thereby fixing the position measuring device for measuring a position of a tip of the electronic pen according to the present invention, to one side of the electronic device 10 or 20.

In order to prevent occurrence of a clearance (a gap) between the insertion member 310 and the communication port provided at one side of the electronic device 10 or 20, the insertion member 310 is preferably formed to have the same standard as the communication port for fit-coupling therebetween.

In a case where a communication unit 500 provides position information on a tip of the electronic pen 140 to the electronic device 10 or 20 by a wireless communication method such as Bluetooth, the insertion member 310 may be implemented as any member fittedly-inserted into the communication port of the electronic device 10 or 20

In a case where the communication unit 500 provides position information on a tip of the electronic pen 140 to the electronic device 10 or 20 by a wired communication method, the insertion member 310 is implemented as a universal serial bus (USB) terminal having the same standard as the communication port of the electronic device 10 or 20. Thus, the insertion member 310 can directly provide position information on a tip of the electronic pen 140 to the electronic device 10 or 20, without an additional configuration for wireless communication.

As aforementioned, one part of the insertion member 310 may be inserted into the communication port of the electronic device 10 or 20, and another part thereof may be connected to the connection member 320 to which the housing 200 is coupled.

The connection member 320 is configured to connect the insertion member 310 and the housing 200 to each other, such that the housing 200 and the insertion member 310 are arranged on a straight line, or they are arranged with a predetermined angle therebetween.

In order to change a position of the position measuring device of the present invention when the position measuring device is attached to an electronic device, the insertion member 310 may be rotatably coupled to the connection member 320.

A joint unit 400 may be provided between the connection member 320 and the housing 200, such that the connection member 320 and the housing 200 are arranged on a straight line, or they are arranged with a predetermined angle therebetween.

The joint unit 400 may include a first inclination surface 410 formed at one end of the connection member 320; a second inclination surface 420 formed at one end of the housing 200; a protruding member 430 protruding from a central part of one of the first inclination surface 410 and the second inclination surface 420, such that the first inclination surface and the second inclination surface are rotatable in a contacted state thereto; and an insertion opening 440 penetratingly-formed at a central part of another inclination surface, and configured to insert the protruding member 430 thereinto.

Each of the first inclination surface 410 and the second inclination surface 420 is preferably formed to have an inclination angle of 45°. Under such configuration, when the housing 200 is rotated in a state where the connection member 320 and the housing 200 have been disposed on a straight line, the housing 200 and the connection member 320 form an angle of 90° therebetween.

That is, in a case where a communication port is provided at a long side of the electronic device 10 or 20, the long side of the electronic device 10 or 20 is arranged in parallel to the rotated housing 200. Under such configuration, a user can select characters, diagrams, etc. or draw a picture, in a state where the electronic device 10 or 20 is laid in a vertical direction.

A plurality of restriction protrusions 411 each having a bent end portion may be formed at one of the first inclination surface 410 and the second inclination surface 420 contacting each other. A plurality of restriction recesses 421, configured to selectively insert and detach the restriction protrusions 411 thereinto/therefrom, may be formed at another of the first inclination surface 410 and the second inclination surface 420.

The reason is in order to maintain a rotated state of the housing 200 with respect to the connection member 320, and thus in order to prevent the housing 200 from moving when a writing surface is changed due to displacement of the electronic device 10 or 20.

The communication unit 500 is configured to provide a position of a tip of the electronic pen 140, by transmitting position information on the tip of the electronic pen 140 calculated by the position measuring unit 100, to the electronic device 10 or 20.

In a case where the insertion member 310 is implemented as a USB terminal, the communication unit 500 may transmit position information on a tip of the electronic pen 140 calculated by the position measuring unit 100 to the electronic device 10 or 20, by a wired communication method. In other cases, the communication unit 500 may transmit position information on a tip of the electronic pen 140 calculated by the position measuring unit 100 to the electronic device 10 or 20, by a wireless communication method such as Bluetooth.

FIGS. 5 and 6 are perspective views illustrating a structure of a position measuring device according to another embodiment of the present invention. The same components as those of the aforementioned embodiment will be provided with the same reference numerals, and detailed explanations thereof will be omitted.

As shown, a connection member 330 of a position measuring device according to another embodiment of the present invention may be rotatably coupled to a housing 200. Preferably, a rotated state of the connection member 330 with respect to the housing 200 is maintained.

For this, a plurality of fixing recesses 331 spaced from each other in a circumferential direction may be concaved from an outer surface of the connection member 330. A fixing protrusion 201, configured to be selectively inserted into the fixing recesses 331 when the connection member 330 is rotated, may protrude from one side of the housing 200.

Preferably, an outer surface of the fixing protrusion 201 is formed to be bent, such that the fixing protrusion 201 having been inserted into the fixing recess 331 is easily separated from the fixing recess 331.

In order to prevent occurrence of a clearance (a gap) in a state where the fixing protrusion 201 has been inserted into the fixing recess 331, an outer surface of the fixing recess 331 is inward bent in correspondence to the outer surface of the fixing protrusion 201. In this case, the outer surface of the fixing recess 331 is preferably made to contact the outer surface of the fixing protrusion 201.

FIGS. 7 and 9 are perspective views illustrating a structure of a position measuring device according to still another embodiment of the present invention. The same components as those of the aforementioned embodiments will be provided with the same reference numerals, and detailed explanations thereof will be omitted.

As shown, a housing 200 of a position measuring device according to still another embodiment of the present invention may include a rear cover 210 which forms an appearance of the housing 200; a circuit board 230 accommodated in the rear cover 210, and electrically-connected to an insertion member 310 when a connection member 340 is fixedly-coupled to the circuit board 230; and a front cover 220 coupled to a front side of the rear cover 210.

An accommodation space for accommodating the circuit board 230 therein is formed in the rear cover 210. An infrared signal receiving unit 110, a first ultrasonic signal receiving unit 120 and a second ultrasonic signal receiving unit 130 of a position measuring unit 100 are positioned on a rear surface of the rear cover 210, so as to be electrically-connected to the circuit board 230.

The connection member 340 is fixedly-coupled to one side on a front surface of the circuit board 230, and the insertion member 310 is attached to the end of the connection member 340 so as to protrude toward a front side of the circuit board 230.

The insertion member 310 is provided with connection terminals on two surfaces thereof, so as not to have directivity when the position measuring device is connected to the electronic device 10 or 20. The insertion member 310 is formed to protrude from the front cover 220 in a penetrating manner when the front cover 220 is coupled to the rear cover 210.

A supporting member 221, having an exposure hole 221a through which two surfaces of the insertion member 310 are exposed to outside, is provided at one side of the front cover 220. The supporting member 221 is configured to support a circumferential surface of the insertion member 310 which forward protrudes from the front cover 220 in a penetrating manner.

The supporting member 221 is provided with a non-conductive sheet 222. The non-conductive sheet 222 is inserted into one side surface of the supporting member 221, such that a non-used connection terminal provided on one surface of the insertion member 310 is shielded from outside.

The non-conductive sheet 222 is a plate-shaped member having the same area as one surface of the insertion member 310, which is inserted into the insertion member 310 in an engaged state with two sides of the supporting member 221. The non-conductive sheet 222 prevents a connection terminal provided on one surface of the insertion member 310, from being electrically-connected to the electronic device 10 or 20. Also, the non-conductive sheet 222 prevents damage of the connection terminal by an external shock.

A switch 223, configured to disconnect an electrical-connection between a non-used connection terminal provided on one surface of the insertion member 310 and the electronic device 10 or 20, may be provided at a central region of the front cover 220.

The switch 223 may be configured to disconnect an electrical-connection between the non-used connection terminal and the circuit board 230, by a user's manual operation after checking a position of the non-used connection terminal not contacting the electronic device 10 or 20.

The switch 223 may be configured to automatically disconnect an electrical-connection between the non-used connection terminal and the circuit board 230, by recognizing an insertion direction of the insertion terminal 310 into the electronic device 10 or 20.

A position information inputting system for inputting position information on a tip of an electronic pen to an electronic device, using the aforementioned position measuring device, includes an electronic pen 140 configured to input content to be displayed on a screen 11 of an electronic device 10 or a screen 21 of an electronic device 20; and the position measuring device configured to measure a position of a tip of the electronic pen 140.

The position measuring device has the same configuration as the position measuring device aforementioned in one embodiment, another embodiment or still another embodiment, and thus detailed explanations thereof will be omitted.

As shown in FIG. 10, the electronic pen 140 for selecting characters or symbols to be input or for drawing a picture on the screen 11 or 21, includes an infrared signal generating unit 141 configured to generate an infrared signal, an ultrasonic signal generating unit 142 configured to generate ultrasonic signals, and a contact sensing unit 143 configured to sense whether a tip of the electronic pen 140 has contacted a writing surface or not.

In order to accurately measure a position of a tip of the electronic pen 140, the infrared signal generating unit 141 and the ultrasonic signal generating unit 142 are preferably arranged at regions close to the electronic pen tip.

The infrared signal generating unit 141 and the ultrasonic signal generating unit 142 are configured to receive power from a battery additionally provided in the electronic pen 140. Preferably, a power button (not shown) is additionally provided at one side of the electronic pen 140 for long-term use of the battery.

A method of measuring a position of a tip of the electronic pen using such position information inputting system according to the present invention will be explained with reference to FIGS. 12 and 13.

First of all, the insertion member 310 is inserted into a communication port of the electronic device 10 or 20 such as the tablet PC 10 or the notebook 20. Then the housing 200 is rotated with respect to the connection member 320, such that the electronic device 10 or 20 is disposed in parallel to the housing 200.

In the position measuring device according to an embodiment of the present invention, a rotated state of the housing 200 is maintained by inserting the restriction protrusions 411 of the first inclination surface 410 into the restriction recesses 412 of the second inclination surface 420. Thus, a motion of the housing 200 is prevented even if the electronic device 10 or 20 is moved while being used.

In the position measuring device according to another embodiment of the present invention, a rotated state of the housing 200 is maintained by inserting the fixing protrusion 201 into the fixing recess 331. Thus, a motion of the housing 200 is prevented even if the electronic device 10 or 20 is moved while being used.

Upon insertion of the insertion member 310 into a communication port, power is supplied to the position measuring unit 100, i.e., the infrared signal receiving unit 110, the first ultrasonic signal receiving unit 120 and the second ultrasonic signal receiving unit 130.

Under such state, if the electronic pen 140 is positioned on a writing surface, an infrared signal generated from the infrared signal generating unit 141 of the electronic pen 140 is received by the infrared signal receiving unit 110, and ultrasonic signals generated from the ultrasonic signal generating unit 142 of the electronic pen 140 are received by the first ultrasonic signal receiving unit 120 and the second ultrasonic signal receiving unit 130, respectively.

In this case, the infrared signal is firstly received by the infrared signal receiving unit 110. Then the ultrasonic signals are received by the first ultrasonic signal receiving unit 120 and the second ultrasonic signal receiving unit 130. Times, when the ultrasonic signals are received by the first ultrasonic signal receiving unit 120 and the second ultrasonic signal receiving unit 130, are variable according to a position of the electronic pen 140.

A propagation speed of an infrared signal in the air is $3*10^8$ m/s, which is much higher than that (340 m/s) of an ultrasonic signal in the air. Therefore, in the present invention, a propagation time of an infrared signal is ignored, and it is assumed that an infrared signal is simultaneously transmitted and received.

Under such configuration, a preset distance between the first ultrasonic signal receiving unit 120 and the second ultrasonic signal receiving unit 130, a distance between a tip of the electronic pen 140 and the first ultrasonic signal receiving unit 120, and a distance between a tip of the electronic pen 140 and the second ultrasonic signal receiving unit 130 are measured. Accordingly, a position of a tip of the electronic pen 140 on the writing surface can be checked. Such position of the tip of the electronic pen 140 is calculated by the position measuring processing unit 150 using the Pythagorean Theorem.

The measured position of the tip of the electronic pen 140 is provided to the electronic device 10 or 20 by the communication unit 500. If the electronic pen 140 touches the screen 11 or 21 (or writing surface) under such state, characters or symbols on the screen 11 or 21 are precisely selected. This can prevent an erroneous operation, thereby enhancing reliability of the product. Further, time taken to input a character or a symbol can be shortened.

In a case where the electronic device 10 or 20 is a mobile communication terminal, the electronic pen 140 is not moved on the small screen 11 of the mobile communication terminal for drawing a picture. Rather, the electronic pen 140 is moved on a writing surface positioned at one side of the mobile communication terminal. Accordingly, a position of a tip of the electronic pen 140 is measured in the same manner as in the aforementioned method. This can allow a user to draw a picture in more detail.

It will be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A position measuring device, comprising:
   a position measuring unit configured to measure a position of a tip of an electronic pen using a reference signal and ultrasonic signals, and configured to input position information on the electronic pen tip to an electronic device;
   a housing where the position measuring unit is installed; and
   a coupling means having one end connected to the housing, and another end coupled to the electronic device, so as to couple the housing to one side of the electronic device,
   wherein the coupling means includes:
   an insertion member inserted into one side of the electronic device; and
   a connection member positioned at one side of the insertion member, and connected to the housing,
   wherein the housing includes:
   a rear cover which forms an appearance of the housing;
   a circuit board accommodated in the rear cover, and electrically-connected to the insertion member when the connection member is fixedly-coupled to the circuit board; and
   a front cover coupled to a front side of the rear cover,
   wherein the insertion member is provided with connection terminals on two surfaces thereof, so as not to have directivity when the position measuring device is connected to the electronic device,
   wherein a supporting member, having an exposure hole through which two surfaces of the insertion member are exposed to outside, is provided at one side of the front cover, the supporting member configured to support a circumferential surface of the insertion member which forward protrudes from the front cover in a penetrating manner, and
   wherein the supporting member is provided with a non-conductive sheet which is inserted into one side surface of the supporting member, such that a non-used connection terminal provided on one surface of the insertion member is shielded from outside.

2. The position measuring device of claim 1, wherein the electronic pen is provided with a reference signal generating unit configured to generate a reference signal, and an ultrasonic signal generating unit configured to generate ultrasonic signals, and
   wherein the position measuring unit includes:
   a reference signal receiving unit provided on one side surface of the housing, and configured to receive the reference signal generated from the reference signal generating unit; and
   a plurality of ultrasonic signal receiving units configured to receive the ultrasonic signals generated from the ultrasonic signal generating unit.

3. The position measuring device of claim 2, wherein the plurality of ultrasonic signal receiving units consist of a first ultrasonic signal receiving unit and a second ultrasonic signal receiving unit positioned at opposite sides based on the reference signal receiving unit.

4. The position measuring device of claim 1, wherein a switch, configured to disconnect an electrical-connection between the non-used connection terminal provided on one surface of the insertion member and the electronic device, is provided at one side of the front cover.

5. The position measuring device of claim 1, wherein a communication unit, configured to provide position information on a tip of the electronic pen to the electronic device, is further installed at the housing.

6. The position measuring device of claim 5, wherein the insertion member is implemented as a universal serial bus (USB) terminal, and the communication unit provides position information on a tip of the electronic pen measured by the position measuring unit, to the electronic device by a wired communication method.

7. The position measuring device of claim 5, wherein the communication unit provides position information on a tip of the electronic pen measured by the position measuring unit, to the electronic device by a wireless communication method.

8. A position information inputting system, comprising:
   an electronic pen configured to input content to be displayed on a screen of an electronic device; and
   the position measuring device of claim 1, the position measuring device configured to measure a position of a tip of the electronic pen.

9. The position information inputting system of claim 8, wherein the electronic pen includes:
   a reference signal generating unit configured to generate a reference signal to be received by the reference signal receiving unit of the position measuring device; and
   an ultrasonic signal generating unit configured to generate ultrasonic signals to be received by the ultrasonic signal receiving units of the position measuring device.

* * * * *